March 10, 1936.　　　　J. J. GALLA　　　　2,033,236

ILLUMINATING CARRIER FOR MARKER PLATES

Filed May 23, 1930

Inventor
Joseph J. Galla
By Wooster & Davis
Attorneys

Patented Mar. 10, 1936

2,033,236

UNITED STATES PATENT OFFICE 2,033,236

ILLUMINATING CARRIER FOR MARKER PLATES

Joseph J. Galla, Bridgeport, Conn.

Application May 23, 1930, Serial No. 454,879

2 Claims. (Cl. 40—132)

This invention relates to signal lights and license plate holding and illuminating means for automobiles.

An object of the invention is to provide an automobile license plate holder and illuminating means in combination with a stop signal lens whereby on the automobile brake being depressed means will be operated to permit the source of light used to illuminate the license plate to also act to illuminate the stop signal.

Another object is to provide an automobile license plate holder including a casing having an open face and a curved rear wall against which the license plate is secured whereby the license plate will be held in a longitudinally curved condition and be more easily readable from a position at either side of the casing, transparent means being provided to close the face of the casing and means, preferably an electric bulb, being disposed to illuminate the license plate at night.

A further object is to provide in a structure of the character stated, a rear or tail light, a stop light, a means to hold a license plate, a means to illuminate the license plate, and throw a light on the ground in the rear of a car to facilitate backing, said means serving also to illuminate the rear or tail light and the stop light when desired.

Other objects and advantages will become apparent from a consideration of the following detailed description taken in connection with the accompanying drawing showing one embodiment of the invention. It, of course, will be understood that the invention is not limited to the details shown since changes in construction, combination and arrangement of parts may be made without departing from the spirit of the invention or the scope of the appended claims to which reference should be had for a definition of the limitations of the invention.

Figure 1:
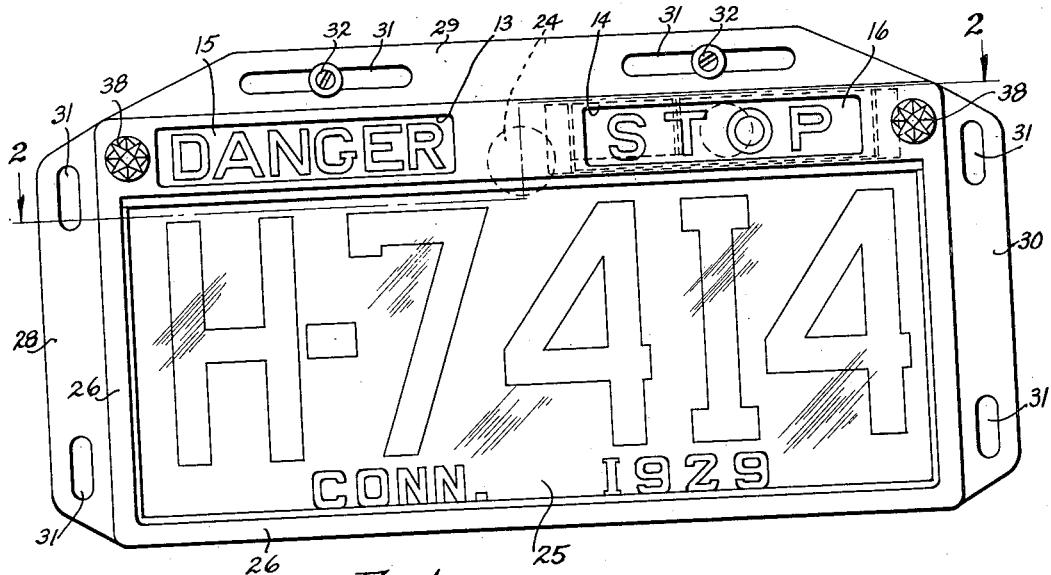
Fig. 1 is a front elevational view of my improved device.

Referring in detail to the drawing my improved illuminating carrier for marker plates and signal means includes a casing 5 having a back 6 longitudinally curved outwardly intermediate its ends as between the points 7 and 8, the curved portion of the rear wall 6 being designated 9. Opposite wall 9, or at its front or face side the casing 5 is open and has its edges bent inwardly providing a flange 10 extending about the open face.

Figure 2:
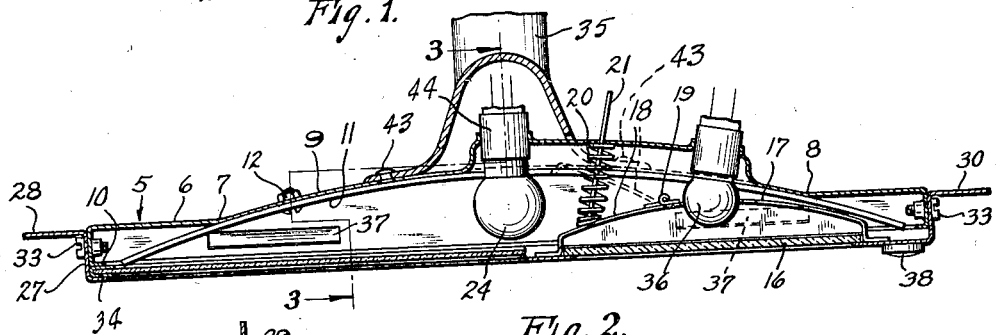
Fig. 2 is a sectional view on the line 2—2 of Fig. 1.
Figure 3:
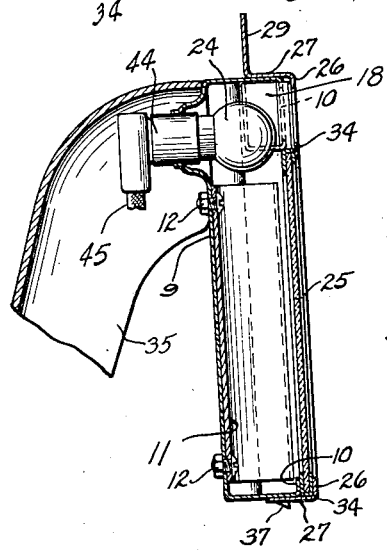
Fig. 3 is a sectional view substantially on the line 3—3 of Fig. 2.

The marker or license plate 11 is disposed against the curved portion 9 of the rear wall 6, being secured thereto as by bolts 12. As shown the marker 11 faces the front or face of the casing 5. When a short marker is used it will extend only between the points 7 and 8 while a large marker, that is, one having more reference characters, will extend to the ends of the casing 5 as best shown in Fig. 2. With the license plate curved as shown it is more easily readable by anyone, as for example, an officer either as he passes a car or as a car passes him.

Flange 10 at the upper forward side of the casing is of considerably greater width than the other portions of the flange and is provided with a pair of openings, one opening being back of a lense 15 red in color to provide a rear or tail light, which may or may not bear a suitable legend, for example, the word "Danger" as shown. In front of the other opening is disposed a lens 16 which is also preferably red in color and which preferably carries the word "Stop" as shown.

Casing 5 is internally divided as by a partition 17, to form a small compartment in the rear of the lens 16. Partition 17 includes a hinged section or door 18 hinged as at 19 and normally maintained closed as by means of a coil spring 20. This spring 20 at one end engages against the door 18 and at its other end bears against a section of the rear wall 6 of the casing and preferably the spring is disposed about a flexible connection as for example a Bowden wire 21 which at one end is connected to the door 18 and at its other end is connected to the foot brake lever 22 as at 23.

Within the upper portion of the casing 5 there is mounted a light bulb 24, the same being disposed to illuminate the marker or license plate 11. This bulb 24 will also illuminate the rear or tail light lens 15 and when the brake 22 is applied wire 21 will be pulled to open the door 18 and permit light rays from the bulb 24 to shine through and thus illuminate the stop light lens 16.

The front or face of the casing 5 is closed by transparent plate 25 of glass or celluloid, whereby to keep out dust, rain or the like. As shown, this plate is disposed against the flange 10, being held in place as by means of the inturned edge 26 of a mounting member 27 which may include outwardly extending flanges 28, 29 and 30 each provided with elongated openings 31 through which bolts or other securing means 32 may be passed to mount the casing 5. For the rear plate these flanges will probably be omitted, and the device mounted on the bracket 35. For the front plate the end flanges 28 or 30, or top flange 29 may be used. Mounting member 27 may be secured to the casing as by means of bolts or the like 33 passing through the mounting means and through the side or edge walls of the casing. Preferably the edges of the transparent plate 25 are disposed in a weather strip 34. The member 27 has openings 13 and 14 in front of the lenses 15 and 16.

When the device is to be used on the front of a vehicle, plain colored glass will be substituted for the danger and stop lenses 15 and 16 respectively. Further, the mounting means 27 will be used for securing the casing 5 when the illuminated marker or license plate holder is used to carry the front license plate.

While any of the flanges 28, 29 or 30 may be used to secure the casing 5 to the rear of a vehicle, a bracket 35 may be used in lieu of these flanges. Ordinarily, the bracket 35 will be used for the rear light and plate while one of the flanges will be used for the front plate. This bracket may be of different constructions, but is preferably of substantially U-shape in cross section as shown and open at the under or inner side. It is preferably secured to the casing adjacent the top thereof as shown at 43 so as to enclose and protect the socket 44. Also the leads 45 to this socket can be passed through the bracket so it is out of sight and protected. Further, if desired, a light bulb 36 may be disposed within the stop light compartment formed by the lens 16 and partition 17, and this bulb may be operated as a stop light by the usual switch connected to the brake lever to light this bulb when the brake lever is depressed.

To provide for the drawing off of the air within the casing 5 to thereby set up a circulation and to prevent condensation on the transparent plate 25 louvers 37 are formed in the bottom wall of the casing. Louvers 37 will be so disposed that as a vehicle equipped with my improved device moves along air passing beneath the device will cause a suction through the louvers to thereby set up a circulation, since some leakage to the interior of the casing will occur. Reflectors 38 may be secured to the upper corner portions of the face of the casing both as a means of ornamentation and of additional caution.

Figure 4:
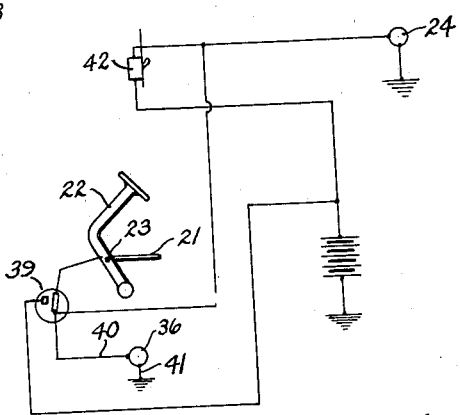
Fig. 4 is a diagrammatic view.

As shown in Fig. 4 light bulb 24 is included in a circuit including a switch 39 connected to the brake lever and adapted to be moved to close the circuit through the wire 40 to the bulb 24 and then to the ground wire 41, upon the brake 22 being applied. From this it will be seen that on the application of the brake, circuit to the bulb 24 is closed and at the same time, and also by the application of the brake the door 18 in the partition 17 is moved open permitting light from the bulb 24 to illuminate the stop lens as previously described. A second hand-operated switch 42 on the dash or steering wheel is connected to light 24 in parallel with brake operated switch 39 so that it can be closed to continuously illuminate the rear plate and provide a rear light for night driving.

When the device is in use at night and it is desirable or necessary to back the car, light from the bulb 24 passing through the plate 25 will serve to illuminate the road immediately in the rear of the car. Therefore, it will be noted that this bulb 24 serves a number of purposes. It illuminates the marker or license tag 11, the rear or tail light lens 15, the stop light lens 16, and as just described serves a purpose when the car is being backed.

Having thus described the invention, what is claimed is:

1. In a license plate holder, a casing having an open face, said casing having a wall opposite said open face curved longitudinally so that a license plate on said wall is concaved longitudinally with its ends adjacent the open face of the casing and its center spaced backwardly therefrom, means to secure a license plate in such longitudinally curved position on said wall and facing said opening, transparent means closing the open face of the casing, and a source of light within the casing at substantially the center of the plate and adjacent one of its longitudinal edges to illuminate the license plate.

2. In a license plate holder, a casing having an open face, means for mounting a license plate within the casing in a longitudinally curved position rearwardly of the opening and facing the opening, a socket in the upper part of the casing at substantially the center of the plate to receive a lamp to illuminate the plate, and a supporting bracket of inverted substantially U-shape in cross section secured to the casing and extending over and embracing the rear end of the socket to enclose and protect it and a lead wire leading thereto.

JOSEPH J. GALLA.